United States Patent [19]

Docker

[15] 3,680,887
[45] Aug. 1, 1972

[54] TRAVEL TRAILER
[72] Inventor: Emerson W. Docker, Ft. Lauderdale, Fla.
[73] Assignee: Docker Safe Trailers, Inc., Fort Lauderdale, Fla.
[22] Filed: Sept. 26, 1969
[21] Appl. No.: 861,301

[52] U.S. Cl. .............................................280/124 A
[51] Int. Cl..................................................B60g 9/00
[58] Field of Search ......280/124, 124 A, 5, 81, 81 B, 280/47.13, 106, 106.5; 267/41, 106.5, 424; 296/23, 28.4, 28.7; 188/110, 112, 135

[56] References Cited

UNITED STATES PATENTS

| | | | |
|---|---|---|---|
| 3,287,058 | 11/1966 | Wells | 296/37 |
| 3,071,267 | 1/1963 | Bunch | 280/106 X |
| 358,530 | 3/1887 | Barry | 267/41 |
| 1,461,497 | 7/1923 | Robbins | 267/41 X |
| 1,655,323 | 1/1928 | Merriell | 267/41 |
| 2,848,243 | 8/1958 | Young | 280/47.13 |
| 2,953,392 | 9/1960 | Haley | 267/41 X |
| 3,276,790 | 10/1966 | McKaig | 296/23 X |
| 3,284,127 | 11/1966 | Willson | 296/23 |

Primary Examiner—Milton Buchler
Assistant Examiner—Carl A. Rutledge
Attorney—Eugene F. Malin

[57] ABSTRACT

A travel trailer having three axes each of which is connected to a hollow tubular trailer frame by cantilever springs. The trailer braking control system is an electrical surge system actuated by inertial forces acting longitudinally on the trailer. The trailer also features a kick-out window for the immediate egress of the trailer occupant if necessary.

1 Claim, 5 Drawing Figures

PATENTED AUG 1 1972 3,680,887
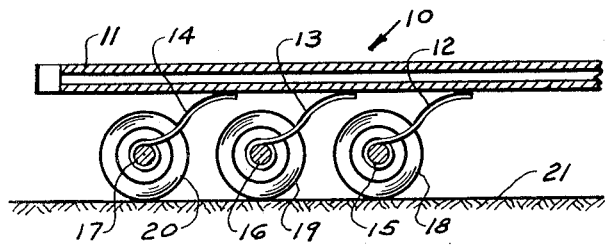
FIG. 1
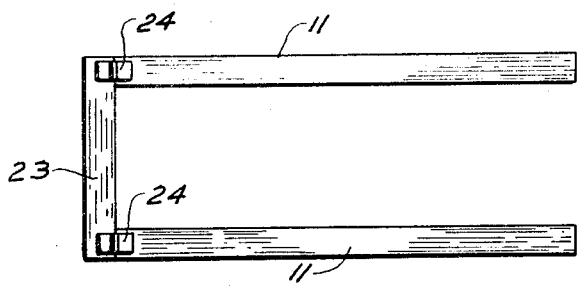
FIG. 2a
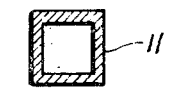
FIG. 2b
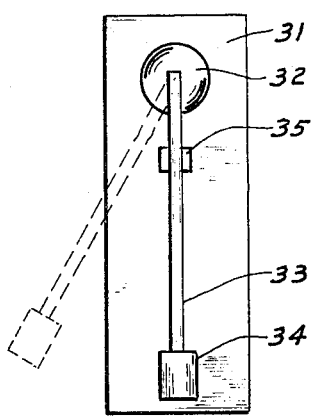
FIG. 3
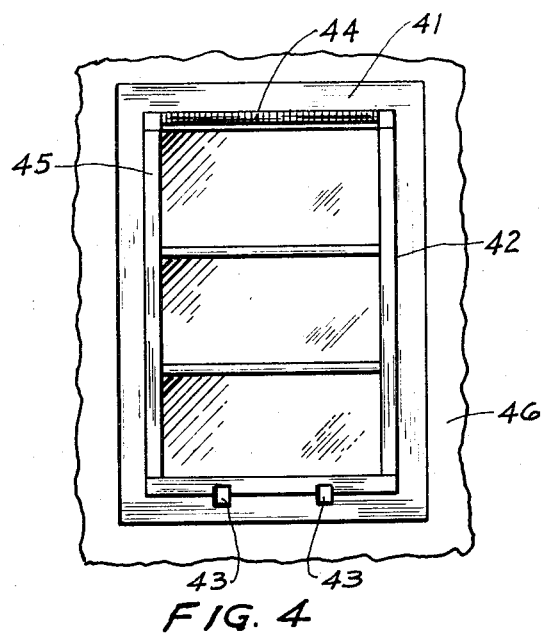
FIG. 4
EMERSON W. DOCKER
INVENTOR.
ATTORNEY

TRAVEL TRAILER

BACKGROUND OF THE INVENTION

This invention relates generally to an improved travel trailer. A travel trailer is a trailer providing mobile compartment or mobile living accommodations and ranging in length from 16 to 30 feet. In the past, most travel trailers have had either single or double axles to bear the entire support of the trailer frame and interior. The result has been that much of the trailer weight has been borne by the trailer hitch attached to the towing vehicle. Also connected to the single or double axle has been conventional springs. Single and double axle trailers easily whip or sway while being towed on the highway. A trailer tire blowout can be a very dangerous occurrence because of the loss of the supporting tire.

Applicant discloses a trailer using three axles, each of which is connected by a cantilever spring to the frame. The result of employing three axles and cantilever springs is increased safety with a reduction of the number of required parts. There are no moving spring parts except the movement in each spring member. No special auto hitch is required to support the trailer. Triple axles provide for a more uniform and equalized trailer weight distribution. They remove the heavy load normally borne by the trailer hitch and the rear end of the towing vehicle. Six point contact with the pavement substantially reduces trailer jack-knife. Applicant also discloses an improved braking control device for a trailer that combines with the triple axle feature to produce superior, efficient braking results. A hollow, tubular trailer frame is employed for added strength while providing storage for sewer and water hoses.

BRIEF DESCRIPTION OF THE INVENTION

A travel trailer comprising a mobile living unit or compartment supported on a frame having three axles that are connected to the frame by cantilever springs. The frame is a hollow tubular member with sufficient interior space to allow storage of sewer and water hoses, along with miscellaneous items, such as fishing poles. The trailer braking control system is a self-contained electrical surge system that is initiated by inertial forces upon the trailer. A rheostat controlling the intensity of braking is positioned by a weight that is moved by inertial forces acting upon the trailer. The trailer also features a hinged kick-out window for the emergency egress of the occupants.

It is an object of this invention to provide a safer travel trailer.

It is another object of this invention to provide a travel trailer requiring less maintenance and up-keep.

It is another object of this invention to provide a travel trailer having improved road handling characteristics.

It is still another object of this invention to provides triple axles for safety and longer life of the travel trailer.

And still another object of this invention is to provide a travel trailer having a stronger tubular frame that allows storage space for sewer and water hoses.

An additional object of this invention is to provide cantilever spring members for a smoother ride.

A further object of this invention is to provide a travel trailer having an independent trailer braking system.

And yet another object of this invention is to provide a travel trailer having an emergency egress exit.

In accordance with these and other objects which will be apparent hereinafter, the instant invention will now be described with reference to the accompanying drawings.

BRIEF DESCRIPTION OF THE DRAWINGS

In the drawings:

FIG. 1 is a cross section showing the trailer frame perpendicular to the axles.

FIG. 2a is a top view of the trailer frame members and the bumper.

FIG. 2b is a perpendicular cross-section of one frame member perpendicular to the longitudinal axis of the frame member.

FIG. 3 is a front view of the independent trailer braking control system panel.

FIG. 4 shows a kick-out window.

DESCRIPTION OF A PREFERRED EMBODIMENT

Referring now to the drawing and in particular to FIG. 1, a preferred embodiment of the invention is illustrated. FIG. 1 shows the undercarriage of a travel trailer indicated generally at 10. Structural frame member 11 is used as the support member for a living platform or compartment, not shown. The living platform may be connected to the frame by conventional means. Frame member 11 is connected to a resilient means consisting of three cantilever springs 12, 13, and 14, respectively. The cantilever springs can be constructed in any well-known manner, but in the preferred embodiment each consists of three sections or leafs. Each spring may be either bolted or welded to frame member 11. The lower end of the springs are attached or connected to axles 15, 16, and 17, respectively. Two springs are attached to each axle. They may be either bolted or welded to the axle. The axles are supported by tires and wheels shown at 18, 19, and 20, respectively. Structural member 11 consists basically of a four sided hollow metal tube with the upper end of the spring attached to one side of the tube. Each axle acts independently of the others. The axle can be of any conventional type that is well-known in the art. FIG. 1 shows one side of the trailer frame and the connecting spring. The preferred embodiment has two structural frame members, one on each side of the trailer with the springs attached to each member as shown in FIG. 1. The axles are spaced relative to each other and the center of gravity of the trailer so that there is no resultant force acting downward on the trailer hitch. Such a triple axle arrangement insures that the entire trailer weight distribution is maintained with the trailer level at all times and reduces or eliminates weight on the trailer hitch attached to a towing vehicle. The exact positioning relationship of each axle with respect to the frame and each other is not considered critical. However, placing the axles too far apart may result in tire scuff. Balance and weight distribution are the essential criteria. By presenting six tires spread over a larger area in contact with the surface of the road instead of the usual two or four found with a single or double axle vehicle, the blowout of one tire presents little danger. Whip and sway caused from wind and towing vehicle motion is negligible. The wheel size is chosen so that no wheel housing protrudes into the trailer compartment, thereby increasing the storage space.

FIG. 2a shows the arrangement of the structural members 11 with respect to a rear bumper 23. The bumper 23 is rotatable around hinges 24. FIG. 2b shows a cross-section of one of the structural members 11. By having the frame member 11 hollow, the frame is stronger and allows storage of sewer and water hoses in the frame itself. Accessibility to the various stored items can be gained through the movable bumper 23 whenever the trailer is parked, such as when connecting up in a trailer park.

FIG. 3 shows an independent braking control mechanism that is intended to be used in conjunction with the triple axle and cantilever springs. The braking control mechanism consists of a mounting board or aluminium panel 31 to which is attached rheostat 32. The rheostat controls the amount of the electricity to an electrically actuated standard mechanical braking system that acts upon the trailer wheel hubs. In one preferred embodiment, four wheel brakes are used. An adjusting arm 33 and a weight 34 are attached or connected to the rheostat 32 so as to rotate as a pendulum when acted upon by inertial forces on the trailer in a forward or backward direction. When an inertial acceleration is applied to the trailer, as for example when the towing vehicle applies its brakes, the weight 34 and control arm 33 move thus changing the setting of rheostat 32. One possible position of movement is indicated in FIG. 3 by the dotted line of arm 33 and weight 34. A locking magnet 35 retains control arm 33 in a neutral position when no longitudinal inertial forces are acting upon the trailer. The electrical energy for the brake operation comes from a 12-volt battery housed within or without the trailer. This may be charged by plug-ins whenever the trailer is parked. This braking control mechanism allows for a completely independent braking system. The braking force applied to the control mechanism will be a function of the control arm rotation. The control panel may be mounted anywhere within the trailer as long as the control arm weight rotates in the plane along the longitudinal axis of the trailer.

To further increase the safety of applicant's travel trailer, a hinged kick-out window as shown in FIG. 4 is provided. Such a window provides a place in the trailer for immediate egress in case of an emergency. Window 45 is mounted in the wooden frame 41 that is fixed to the trailer housing 46. A weather strip 42 surrounds three sides of the window. The fourth side contains hinge 44. The window is locked from the inside by latches 43. The window 45 can be pushed open in case of emergency. It will remain fixed to hinge 44. A push or kick along the bottom or side portions of the window will overcome the locking force of the latches 43, rotating the window open along hinge 44, thus providing for immediate egress.

In operation, the triple axles of applicant's trailer provide a more stable platform, especially when in motion. The cantilever springs provide a smoother ride, while requiring no moving parts, thus reducing maintenance and depreciation costs. The hollow frame provides stronger structural foundation while providing a storage place for sewer and water pipes and miscellaneous items. The independent braking system provides safe, sure trailer braking while requiring no connection with the towing vehicle.

The instant invention has been shown and described herein in what is considered to be the most practical and preferred embodiment. It is recognized, however, that departures may be made therefrom within the scope of the invention.

What is claimed is:

1. A travel trailer comprising, a compartment,
    at least two longitudinally disposed rectangular shaped hollow supporting means for supporting said compartment and providing at least two separate storage spaces, each said supporting means includes a single opening in the rear of each supporting means for access to said storage space,
    at least three axles,
    a plurality of wheels connected to each axle, and cantilever springs connected between the said axles and said supporting means.

* * * * *